United States Patent [19]

Grothaus et al.

[11] Patent Number: 4,696,126
[45] Date of Patent: Sep. 29, 1987

[54] METHOD OF TRAPPING FLYING INSECTS

[75] Inventors: Roger H. Grothaus; Donald W. Hildebrandt, both of Racine, Wis.

[73] Assignee: S. C. Johnson & Son, Inc., Racine, Wis.

[21] Appl. No.: 858,416

[22] Filed: May 1, 1986

Related U.S. Application Data

[63] Continuation-in-part of Ser. No. 607,371, May 7, 1984.

[51] Int. Cl.[4] ............................................. A01M 1/22
[52] U.S. Cl. .................................................... 43/112
[58] Field of Search ......................... 43/112, 113, 121

[56] References Cited

U.S. PATENT DOCUMENTS

| | | | |
|---|---|---|---|
| 1,065,782 | 6/1913 | Cronk | 43/112 |
| 1,549,161 | 8/1925 | Sutton | 43/112 |
| 2,384,190 | 9/1945 | Miller | 43/112 |
| 3,077,050 | 2/1963 | Makara | 43/112 |
| 3,321,862 | 5/1967 | Peek | 43/112 |
| 3,465,468 | 9/1969 | Takamoto | 43/112 |
| 3,491,478 | 1/1970 | Gilbert | 43/112 |
| 3,680,251 | 8/1972 | Springer | 43/112 |
| 3,729,857 | 5/1973 | Giodano | 43/112 |
| 3,758,980 | 9/1973 | Bialobrzeski | 43/112 |
| 3,768,196 | 10/1973 | Iannini | 43/112 |
| 3,986,292 | 10/1976 | Klebanoff | 43/112 |
| 3,998,000 | 12/1976 | Gilbert | 43/112 |
| 4,226,043 | 10/1980 | Peterson | 43/112 |
| 4,423,564 | 1/1984 | Davies et al. | 43/121 |

FOREIGN PATENT DOCUMENTS

| | | | |
|---|---|---|---|
| 0160950 | 11/1985 | European Pat. Off. | |
| 454726 | 6/1913 | France | 43/112 |

Primary Examiner—M. Jordan

[57] ABSTRACT

A method of trapping common houseflies and many other flying insects is disclosed. The method utilizes a device comprising an upright array of parallel exposed conductors dimensioned and spaced such that alighting houseflies virtually have to alight in contact with two such conductors, means to periodically apply opposing pulsating charges to adjacent pairs of such conductors which causes such houseflies to dive downwardly toward an adhesive-covered sheet or other means to receive and hold insects diving from the array. The charges are about 25 to 40 volts peak and have a frequency of about 60 to 600 Hz. Applying such charges as a square wave is very hightly preferred.

4 Claims, 4 Drawing Figures

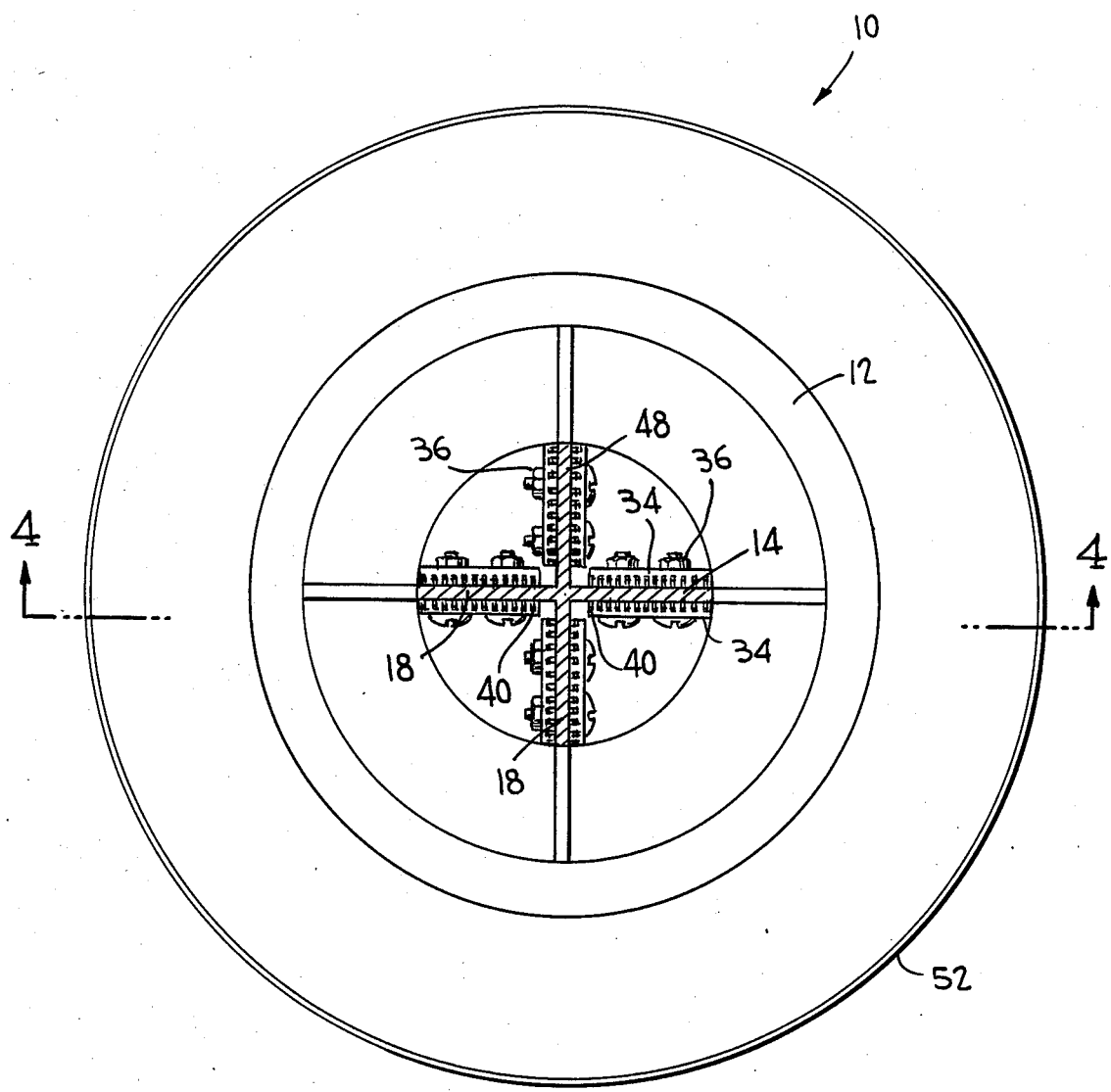

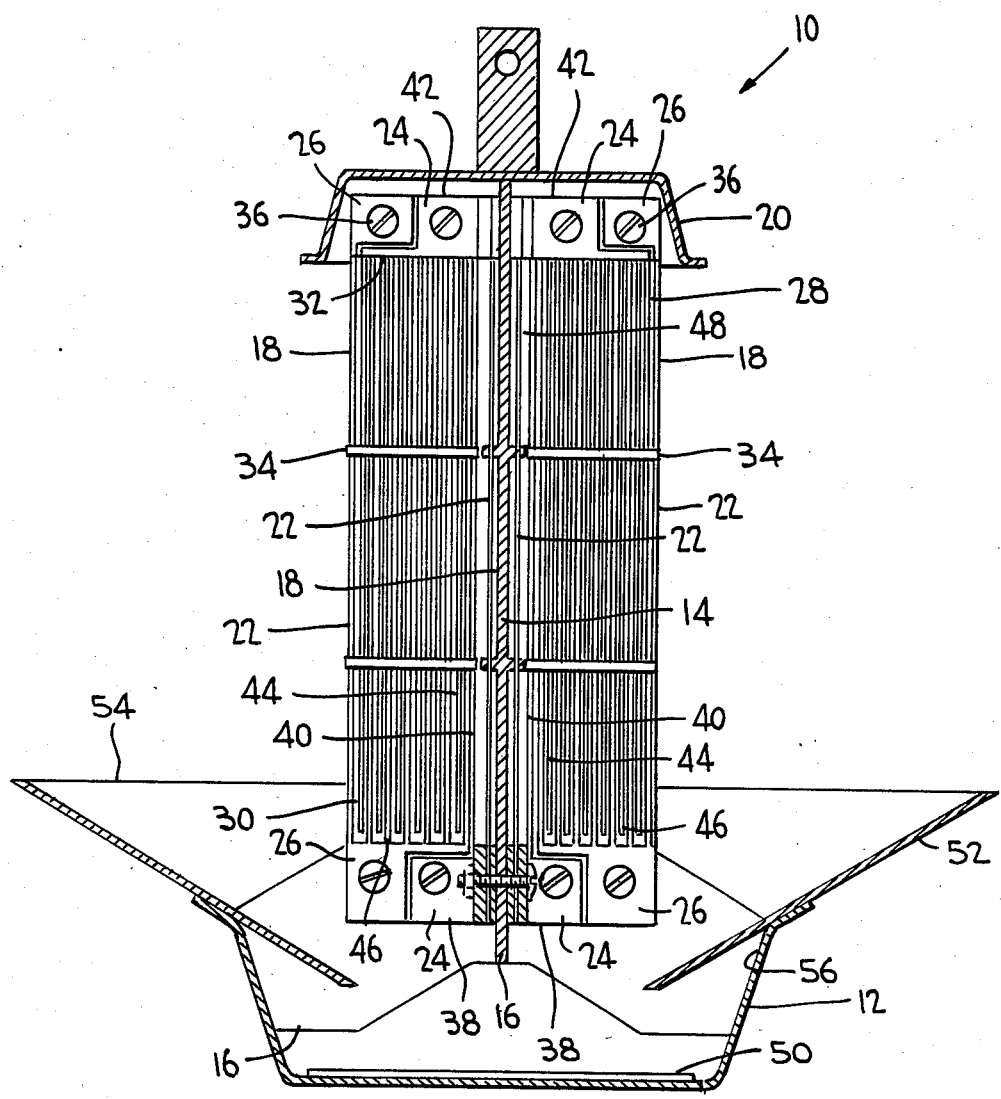

METHOD OF TRAPPING FLYING INSECTS

REFERENCE TO RELATED APPLICATION

This application is a continuation-in-part of patent application Ser. No. 607,371, filed May 7, 1984, the benefit of which is now claimed for purposes of priority pursuant to 35 U.S.C. §120.

FIELD OF THE INVENTION

This invention is related to the field of insect control and more specifically to methods and devices for trapping and killing common houseflies and other flying insects.

BACKGROUND OF THE INVENTION

A variety of devices and methods have been used to control the number of common houseflies and other flying insects. Among these are chemical sprays, evaporating insecticides, strips for capturing flies and other insects by means of an exposed adhesive, and electrocution devices. Each of these devices and methods has certain advantages and drawbacks.

For example, electrocution devices are deemed undesirable because of the noise that they cause when a spark is discharged to kill an insect passing between two oppositely charged electrodes. Furthermore, such devices often are covered with partially-dried dead insects, which is unsightly and a problem to clean. Also, such devices may be dangerous because of the high voltage required to electrocute the insects.

Examples of devices for electrocuting insects include the disclosures of the following patent documents:

| | | | |
|---|---|---|---|
| U.S. Pat. No. | 3,935,662 | U.S. Pat. No. | 4,275,523 |
| U.S. Pat. No. | 3,894,351 | U.S. Pat. No. | 4,037,351 |
| U.S. Pat. No. | 4,109,408 | U.S. Pat. No. | 2,881,563 |
| U.K. Spec. | 1,444,089 | France | 2,411,563 |
| German Offenlegungsschrift | | | 1,607,361. |

Many of the electrocution devices also include a bright light or other insect-attracting device. Such devices draw the insects into what is believed to be essentially inadvertent contact or near contact with oppositely charged electrodes. Such contact or near contact bridges or nearly bridges the gap between the oppositely charged electrodes causing a spark to jump the gap by passing through the insect.

Another type of electrical device for killing insects stuns the insect causing it to fall into a receptacle of some kind. Examples of such devices are those disclosed in the following patent documents:

| | | | |
|---|---|---|---|
| U.S. Pat. No. | 4,423,564 | U.S. Pat. No. | 2,307,163 |
| U.S. Pat. No. | 2,038,495 | Russia | 547,201. |

Such devices relate to the trapping and killing of crawling insects and are not concerned with control of flying insects.

Fly strips of the type having adhesive to trap flies or other alighting insects are messy to handle, both before and after insects have been trapped thereon. Furthermore, such strips are often very unsightly.

While insecticide sprays are very effective, some people do not want to spray in certain rooms. Evaporating chemicals which fill a space with insecticide vapors are sometimes thought to produce undesirable odors.

In short, there is a need for an improved device to control the number of houseflies and other flying insects in a room or other space. There is a need for an effective, silent, non-messy and safe device to eliminate flying insects.

BRIEF SUMMARY OF THE INVENTION

The device of this invention is a safe, silent, non-messy and effective trap for common houseflies and flying insects of comparable or greater size.

The trap of this invention has an upright array of substantially parallel exposed conductors. Each of the conductors are of insufficient width to allow an adult housefly to easily alight on only one conductor, but adjacent pairs of conductors are separated by air and closely spaced such that an alighting housefly, in almost every case, must contact two conductors. The device includes means to periodically generate opposing pulsating charges in adjacent pairs of the conductors, the charges having about 25 to 40 volts peak (i.e., 50-80 volts peak-to-peak) and a frequency of about 60 to 600 Hz. Below the upright array of conductors is a means to receive and hold insects diving from the array.

The conductors are preferably generally vertical wires, since flies are known to be attracted to vertical wires. The array may have as few as two parallel wires or may have a great many. The device preferably includes a fly-attracting backdrop adjacent to the array. This may be a backdrop surface of contrasting color or may be a surface of a color known to be attractive to houseflies, such as red or black.

The array preferably surrounds a fly-attracting core member of some kind, whether it be an attractive and/or contrasting color, ultraviolet light, feeding stimulants, aggregation pheromones or mating pheromones. The array may be configured in several ways, such as a loop of vertical parallel conductors or any other convenient shape or configuration.

The holding means at the base of the array is preferably a replaceable sheet covered with an adhesive for holding insects. Such sheet is preferably circular. The device preferably includes a funnel above the sheet in position to direct the diving insects onto such sheet. The device preferably includes a lateral wall which shields the replaceable sheet, and the insects stuck thereto, from view at least from a side direction.

The periodically generated charges are preferably generated for short periods at equal intervals, with no charges being generated in the intervening periods. For example, the charges may be generated for one second every thirty seconds. That gives alighting flies and other insects an opportunity to get well attached to a pair of conductors before the charges are applied.

In highly preferred embodiments of this invention, the opposing charges are applied as square waves. Interestingly, the use of square waves provides a significantly higher capture rate than sine waves or a variety of other pulsating wave forms.

This invention is based in part upon the discovery that houseflies (*Musca domestica*) will behave in an unexpected and unusual way when subjected to a less than lethal electric shock of the type described herein. When subjected to such shock, houseflies actually fly with considerable force in a generally downward direction, rather than simply dropping or flying off in somewhat random directions.

When attempting to escape from some perceived threat, houseflies normally fly away in a generally backward direction. Thus, if their heads are oriented in a downward direction, the houseflies would normally fly tail-first in an upward direction, or vice versa. Or, if their heads are to the right, they will fly toward the left. However, with this invention, regardless of their direction of orientation on the array of conductors, the houseflies nearly all dive with power in a downward direction.

Because the voltage applied in the device of this invention is so low, the exposed conductors can be touched without noticeable electric shock, even to a damp hand. Furthermore, because no noisy sparks are generated, the device operates silently and flies do not get stuck on the conductors. And, the preferred replaceable sheets can easily be discarded.

OBJECTS OF THIS INVENTION

An object of this invention is to provide an improved device for trapping and killing common houseflies and other flying insects of comparable or larger size.

Another object of this invention is to provide a device for killing flying insects which is silent in operation.

Another object of this invention is to provide a device for killing flying insects which is safer than devices of the prior art for electrocuting such insects.

Another object of this invention is to provide a device for killing flying insects which is not messy in its appearance and may be cared for with relative ease.

Another object of this invention is to provide a device for automatically killing common houseflies and certain other flying insects which is effective in operation.

These and other objects will be apparent from the description of preferred embodiments and from the drawings, wherein:

BRIEF DESCRIPTION OF THE DRAWINGS

FIG. 3 is a top sectional taken along section 3—3 as illustrated in FIG. 2.

FIG. 4 is a side sectional taken along section 4—4 as illustrated in FIG. 3.

DETAILED DESCRIPTION OF PREFERRED EMBODIMENTS

Figure 1:
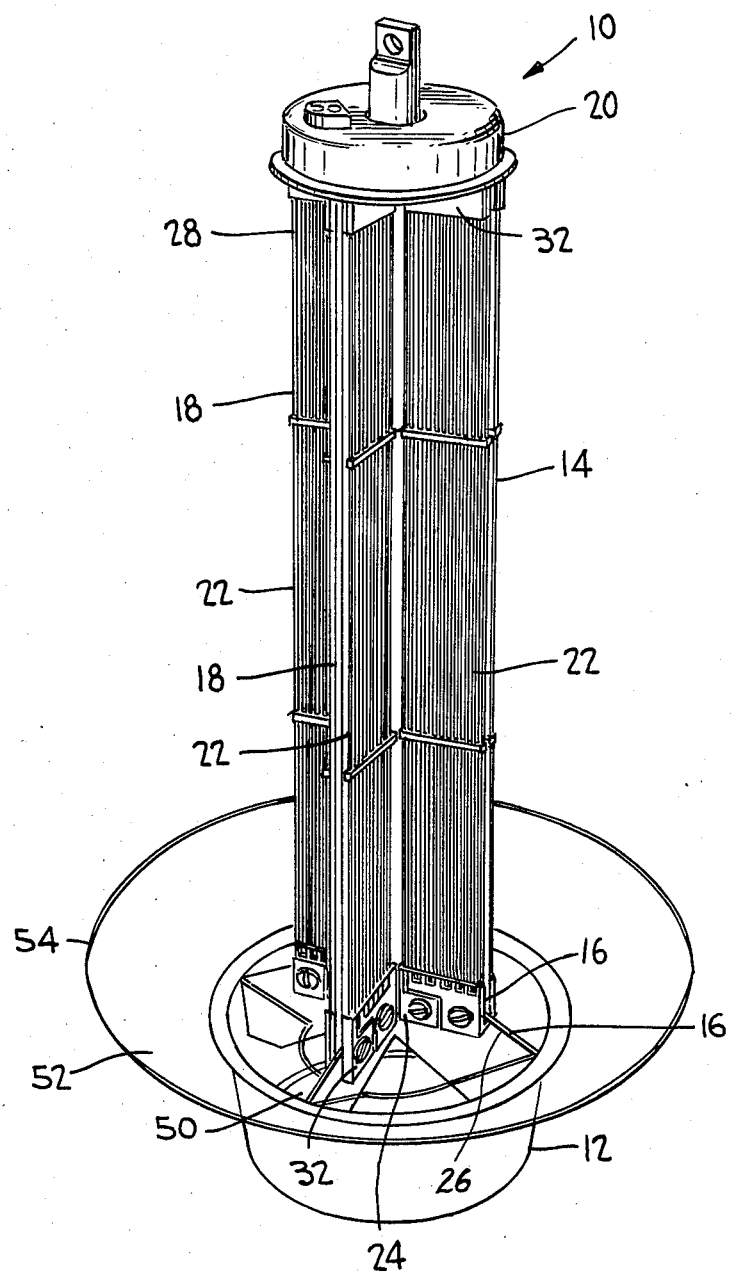
FIG. 1 is a perspective view of a flytrap in accordance with this invention.
Figure 2:
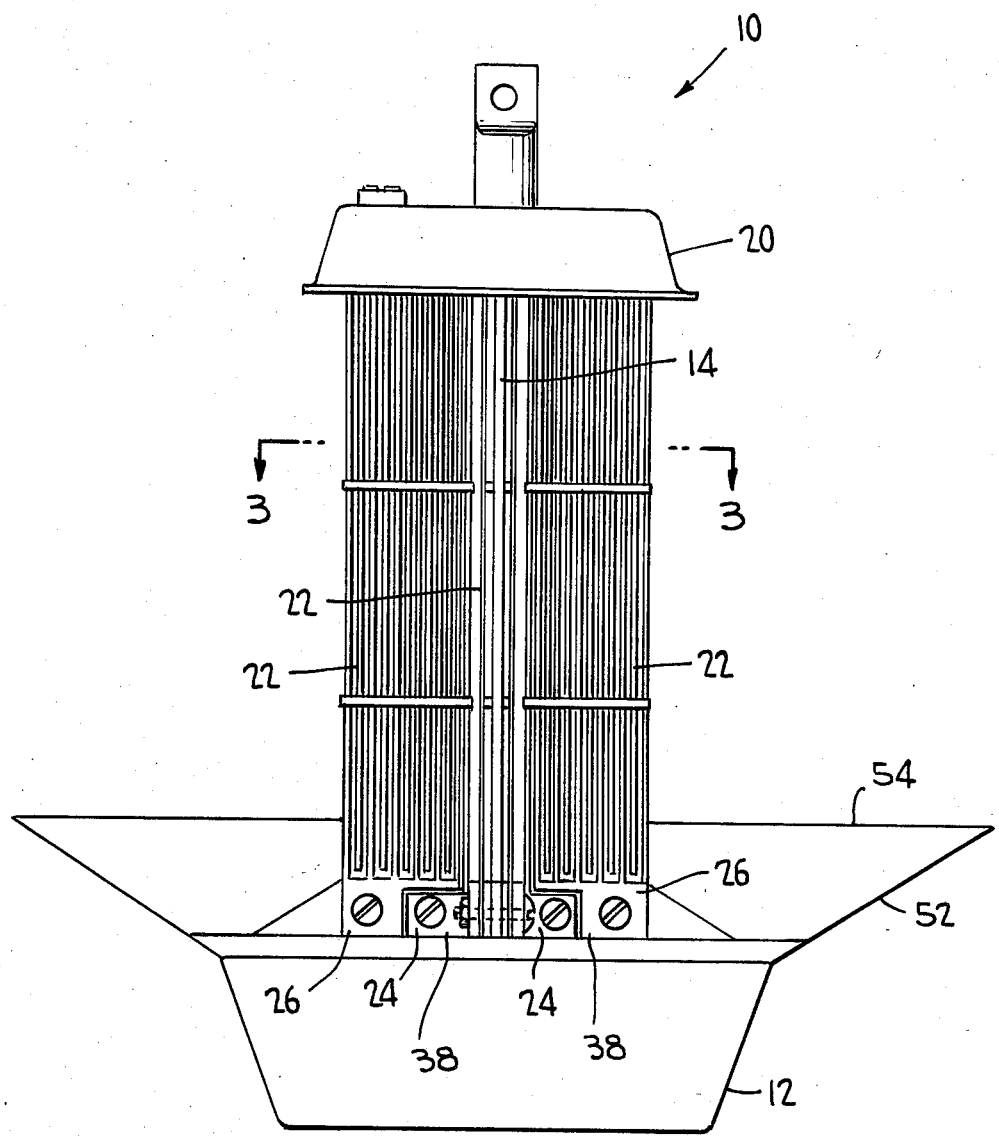
FIG. 2 is a front elevation.

The figures illustrate a preferred trap 10 for common houseflies and other flying insects in accordance with this invention.

Flytrap 10 includes a base cup 12 supporting a stanchion 14 sized at its lower end 16 to be received into base cup 12. Stanchion 14 includes four narrow vertical plastic boards 18 which flare outwardly near lower end 16. Above the flared portions, vertical boards 18 form a right-angle cross when viewed in top cross section. The top of stanchion 14 is received in a control cap 20.

On each side of each of the four vertical boards 18 is an array 22 of substantially parallel vertical wires extending from near lower end 16 to above the open bottom of control cap 20. Since each of the eight arrays in this preferred embodiment are identical, only one will be described in detail.

Array 22 has a first part 24 and a second part 26, each of which is an exposed conductor indirectly secured onto vertical board 18. The upper end 28 and lower end 30 (FIG. 4) of each of first and second array parts 24 and 26 are each sandwiched in a plastic mounting plate 32. Mounting plates 32 serve as spacers to maintain about 0.40 cm or more in spacing between the wires of array 22 and the surface of plastic board 18. Mounting plates 32 at each end of array 22 are secured to vertical board 18 by bolts 36. On the opposite surface of each vertical board 18 another similar array is mounted by means of the same bolts. Bolts 36 also serve to conduct the applied electrical charges between similar array parts on the opposite surface of each board 18.

Two wire locators 34 are attached to vertical board 18 at points along the length of the array. Wire locators 34 serve to maintain the intended spacing between the wires of array 22.

First part 24 of array 22 includes a bottom end portion 38 from which a main vertical wire 40 extends upwardly to a top end portion 42. Five wires 44 extend downwardly from top end portion 42 of first array part 24. Second part 26 of array 22 includes similar end portions, but with the bottom and top portions being reversed such that second array part 26 has five upwardly extending wires 46 which are between and closely adjacent to downwardly extending wires 44, in alternating fashion. The use of first and second array parts 24 and 26 allows opposing charges to be applied to every other wire.

All of wires 44 and 46 of array 22 are parallel and vertical. Each of these conducting wires is of insufficient width to allow an adult housefly to easily alight on only one such conductor. Since the wires of array 22 are spaced from the surface of vertical board 18, adjacent pairs of wires 44 and 46 are separated only by air. The wires of each such pair are closely spaced such that an alighting housefly contacts both wires of the pair. The wires are preferably close enough to prevent adult houseflies from passing easily between them.

Each vertical board 18 of stanchion 14 serves not only as means to support the array 22 of wires, but as a backdrop which attracts flies. The attraction occurs either because of the color of such backdrop or because of the visual contrast between the wires and the backdrop. Fly-attracting colors include red and black, so the use of such colors is believed to be helpful.

The eight separate arrays 22 together form a large array surrounding a fly-attracting core 48 consisting of the four boards 18 forming stanchion 14. A surrounding array can be in other forms, such as a cylindrical or square form (when viewed from above).

The fly-attracting core member may have its fly-attracting qualities by virtue of color or contrast, as noted, or because it includes a feeding stimulant (such as sugar), aggregation pheromones, mating pheromones, ultraviolet light or some other kind of stimuli. A combination of fly-attracting means may be used.

Contained within control cap 20 are electrical circuit means (not shown) to periodically generate opposing pulsating charges in alternating wires 44 and 46. Such charges have about 25 to 40 volts peak (50 to 80 volts peak to peak). Higher voltages give rise to safety problems. Lower voltages have insufficient effectiveness. A preferred voltage is about 35 volts. While effective fly-catching is possible within a frequency range of about 60 to 600 Hz, the most preferred frequency is on the order of 300 Hz.

It is highly preferred to apply such charges as square waves, since such have been shown with this invention to provide a statistically significant advantage in fly-catching efficiency when compared to sine waves.

The charges are preferably applied at equal time intervals and for equal durations each time. For example, applying such pulsating charges one second at thirty second intervals has been found very acceptable. This timing provides flies an opportunity to get well attached to a pair of wires but probably not depart therefrom before the pulsating charges are applied.

The choice of what time interval to use and of how long to apply the pulsating charge depends on a number of factors. For example, if batteries are being used as the power source, battery life is one important factor which must be considered. Other factors to consider would be apparent to those skilled in the art and familiar with this disclosure.

Rather than using the preferred equal time intervals and short periods of pulsating charge application, the device can be designed to detect the presence of a fly or other insect of comparable or large size on array 22 and to trigger the pulsating charge because of such presence.

Acceptable circuit means for generating such pulsating charges are well known to those skilled in the art who are familiar with the disclosure of this invention. For example, when the power source is a battery (e.g., 6 V or 9 V), then the circuit would preferably have an appropriate simple gated oscillating circuit, including integrated circuit chips and discrete capacitor(s), transistor(s) and resistor(s), and a transformer to step up the voltage. All such circuit elements can be located in control cap 20. Wires in control cap 20 would connect the circuitry to array parts 24 and 26 by means of bolts 36. If the power source is house current, the same circuitry can be used with the addition of an appropriate adaptor.

Placed on the inside bottom of base cup 12 below stanchion 14 is replaceable circular sheet 50, made of paper covered with an adhesive on its exposed upper surface. The adhesive causes flies diving onto it to adhere such that they will be trapped and die. Suitable adhesives are well-known to those skilled in the art. One example is a soft highly tacified hot melt compound known as B. F. Goodrich 490, from B. F. Goodrich, Akron, Ohio. Circular sheet 50 is sized to fit into base cup 12, and may be removed and replaced by lifting stanchion 14 from base cup 12.

Secured to the outwardly flaring lower ends of vertical boards 18 is a funnel 52. Funnel 52 has an upper edge 54 defining an open upper end of wide diameter relative to the top of base cup 12 and a lower edge of reduced diameter which is received into base cup 12. When flies receive the shock provided by the pulsating charges referred to above, they dive in a generally downward direction to hit the funnel surface and be directed into the base cup 12 and onto the adhesive surface of circular sheet 50. Use of the funnel allows capture of more of the diving flies coming from wire array 22.

The trap of this invention works as follows: Flies which are attracted to stanchion 14 or array 22 alight on a pair of adjacent wires of array 22. Alighting normally occurs when no charge is applied to such adjacent wires. After a few seconds has elapsed, pulsating charges are applied to the pair of wires. This does not electrocute the fly, but instead causes it to dive forcefully in a downward direction. The fly enters the base cup 12, either directly or after being guided there after contact with funnel 52. The fly then impacts the adhesive surface of circular sheet 50 and is stuck thereon and soon perishes.

The base cup 12 includes an upright wall 56 which can shield the fly-covered adhesive sheet from view. Such shield is particularly effective when flytrap 10 is hanging high, such as from the ceiling of a room. Eyelet 58 facilitates such hanging.

In some cases, particularly in embodiments for use in barns, it may be desirable to use a bucket or jar filled with a water-surfactant solution as the means to receive and hold insects diving from the wire array. The solution has low surface tension, so the insect is received into the mixture to quickly drown. Other receiving and holding means may be used.

While in the foregoing specification this invention has been described in relation to certain preferred embodiments and many details have been set forth for purposes of illustration, it will be apparent to those skilled in the art that the invention is susceptible to additional embodiments and that certain of the details described herein can be varied considerably without departing from the principles of the invention.

What is claimed is:

1. A method for trapping flies and flying insects of comparable size, comprising:

making available to the flying insects a trap which comprises an array of substantially parallel exposed conductors, means below the array for receiving and holding insects, means adjacent the array for directing downwardly flying insects into contact with the receiving-and-holding means, and means for periodically generating opposing pulsating charges and delivering such charges to adjacent pairs of the conductors;

applying no charge to the adjacent pairs of conductors so as to allow flying insects that are attracted to the trap to alight on adjacent pairs of the conductors; and operating the pulsating-charge means so as to deliver to the exposed conductors charges having about 25 to 40 volts peak and a frequency of about 60 to 600 Hz, thereby causing the flies that have alighted on adjacent pairs of the conductors to be subjected to a less-than-lethal shock which causes the conductor-alighted flies to fly in a generally downward direction into the insect receiving-and-holding means via the flying insect-directing means.

2. The method of claim 1 wherein the charges are applied as square waves.

3. The method of claim 1 wherein the trap additionally contains a means for attracting flies.

4. The method of claim 1 wherein the charge is applied at a voltage of about 35 volts peak and a frequency of about 300 Hz.

* * * * *